358-86. OR 3,833,757 SR

United States Patent [19]
Kirk, Jr. et al.

[11] 3,833,757
[45] Sept. 3, 1974

[54] ELECTRONIC BILATERAL COMMUNICATION SYSTEM FOR COMMERCIAL AND SUPPLEMENTARY VIDEO AND DIGITAL SIGNALING

[75] Inventors: Donald Kirk, Jr.; Michael J. Paolini, both of St. Petersburg, Fla.

[73] Assignee: Computer Television Inc., New York, N.Y.

[22] Filed: Apr. 10, 1972

[21] Appl. No.: 242,721

[52] U.S. Cl. .......... 178/5.6, 178/DIG. 13, 179/15 A, 325/53, 325/309, 343/178, 343/204
[51] Int. Cl. .......... H04n 1/44, H04n 7/18
[58] Field of Search .......... 178/5.6, DIG. 1, DIG. 13, 178/5.1 R; 179/37, 15 A; 340/313, 184; 325/308, 309, 53; 343/178, 204

[56] References Cited

UNITED STATES PATENTS

| | | | |
|---|---|---|---|
| 3,230,302 | 1/1966 | Bruck et al. | 178/5.1 |
| 3,534,161 | 10/1970 | Friesen et al. | 178/5.6 |
| 3,668,307 | 6/1972 | Face et al. | 178/5.6 |
| 3,684,823 | 8/1972 | McVoy | 178/5.1 |
| 3,730,980 | 1/1973 | Kirk, Jr. | 178/5.1 |
| 3,733,430 | 5/1973 | Thompson et al. | 178/5.1 |

OTHER PUBLICATIONS

"Two-Way Applications for Cable Television Systems in the '70's"–Ronald K. Jurgen, November 1971, pp. 39–56 of I.E.E.E. Spectrum Applications Report.

*Primary Examiner*—Robert L. Richardson
*Assistant Examiner*—Marc E. Bookbinder
*Attorney, Agent, or Firm*—Stephen B. Judlowe

[57] ABSTRACT

A bilateral cable communications system — as for a lodging facility, distributes commercial and supplementary video programs from common equipment to spaced subscriber stations located, for example, in each hotel-motel room. Heterodyne converter apparatus is included at each station for viewing the supplementary programing on a standard television receiver.

Time division multiplexed, full duplex digital communications are also effected via the distribution cable for providing signaling between the common equipment and the subscriber locations. The digital signaling implements administrative and supervisory control for supplementary video reception and monitoring — as for extra fee accounting purposes, and also general lodging service tasks.

18 Claims, 5 Drawing Figures

ROOM EQUIPMENT

Figure 1A:
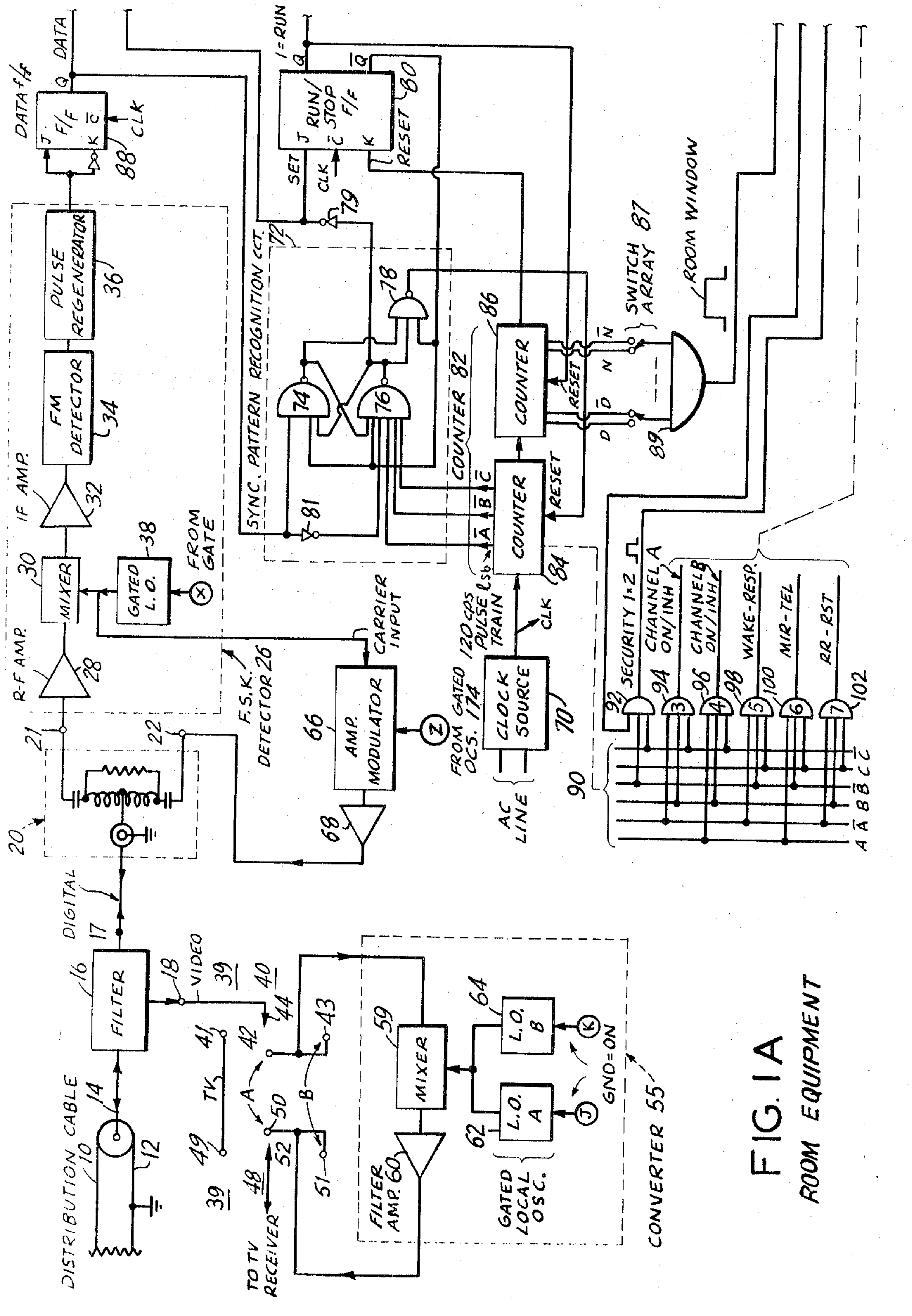

ELECTRONIC BILATERAL COMMUNICATION SYSTEM FOR COMMERCIAL AND SUPPLEMENTARY VIDEO AND DIGITAL SIGNALING

DISCLOSURE OF INVENTION

This invention relates to electronic signal distribution systems and, more specifically, to a bilateral signal translating system for distributing commercial and supplementary video programing from a central station to plural spaced subscriber stations, and for providing bilateral signaling between the central and subscriber stations.

In selected present day private communications systems, it has been found desirable to provide some electronic intelligence which may be received only by system subscribers who pay for this service. Thus, we have found that lodging service is enhanced for all concerned where the hotel-motel proprietor makes supplementary programing — e.g., theater, first run movies, sporting events or the like available, as on an extra fee basis, on the television receiver presently located in most leased rooms. This is, of course, in addition to providing normal commercial television programing broadcast by local stations without charge.

Moreover, it is further desirable from an administrative standpoint to provide bilateral communications between one or more central locations in a lodging facility and the several hotel-motel rooms - both in conjunction with the supplementary television programing and otherwise.

It is thus an object of the present invention to provide an improved private service communications system.

More specifically, it is an object of the present invention to provide a two wire analog-digital cable system for distributing commercial and supplementary video signals, and for providing bilateral noninterfering signaling and control between remote stations and central common equipment.

The above and other objects of the present invention are realized in a specific, illustrative system for providing bilateral communications between common equipment and plural subscriber locations via a two wire cable. The common equipment generates a signal ensemble which includes commercial video programing in its normal spectrum allocation; supplementary video signals (as in the midband channel 6–7 gap); and, during selected (transmission mode) cycles, frequency shift keyed (FSK) digital information. The digital data is sent to the several systems room-subscriber stations on a time division multiplexed basis, the message for all rooms containing a like number of bits and encoded in a like format. The common and remote stations each include a digital clock (advanced at a multiple of AC line frequency), all system clocks being maintained in synchronization by a sync code burst from the common equipment.

At any room location, commercial television is received in normal fashion, or a supplementary video signal may be displayed by heterodyne frequency-shifting the selected signal to a locally vacant channel. Apparatus is also included to recover the plural bit message for that station during a transmission mode cycle, and for implementing the tasks dictated by that message. Thus, for example, the message may lock out (inhibit) any or all supplementary programing (e.g., a film intended for a restricted audience); sound a wake-up alert; illuminate a "message at desk" signaling lamp, or the like.

Correspondingly, during reception mode cycles (transmission from the room station sets to the common equipment), room status parameters such as identification of any supplementary channel being viewed; chambermaid in room; acknowledgement to a wake-up alert; a security signal (television in/not in room); and the like are communicated to the common station, also on a time division multiplexed basis.

Figure 1B:
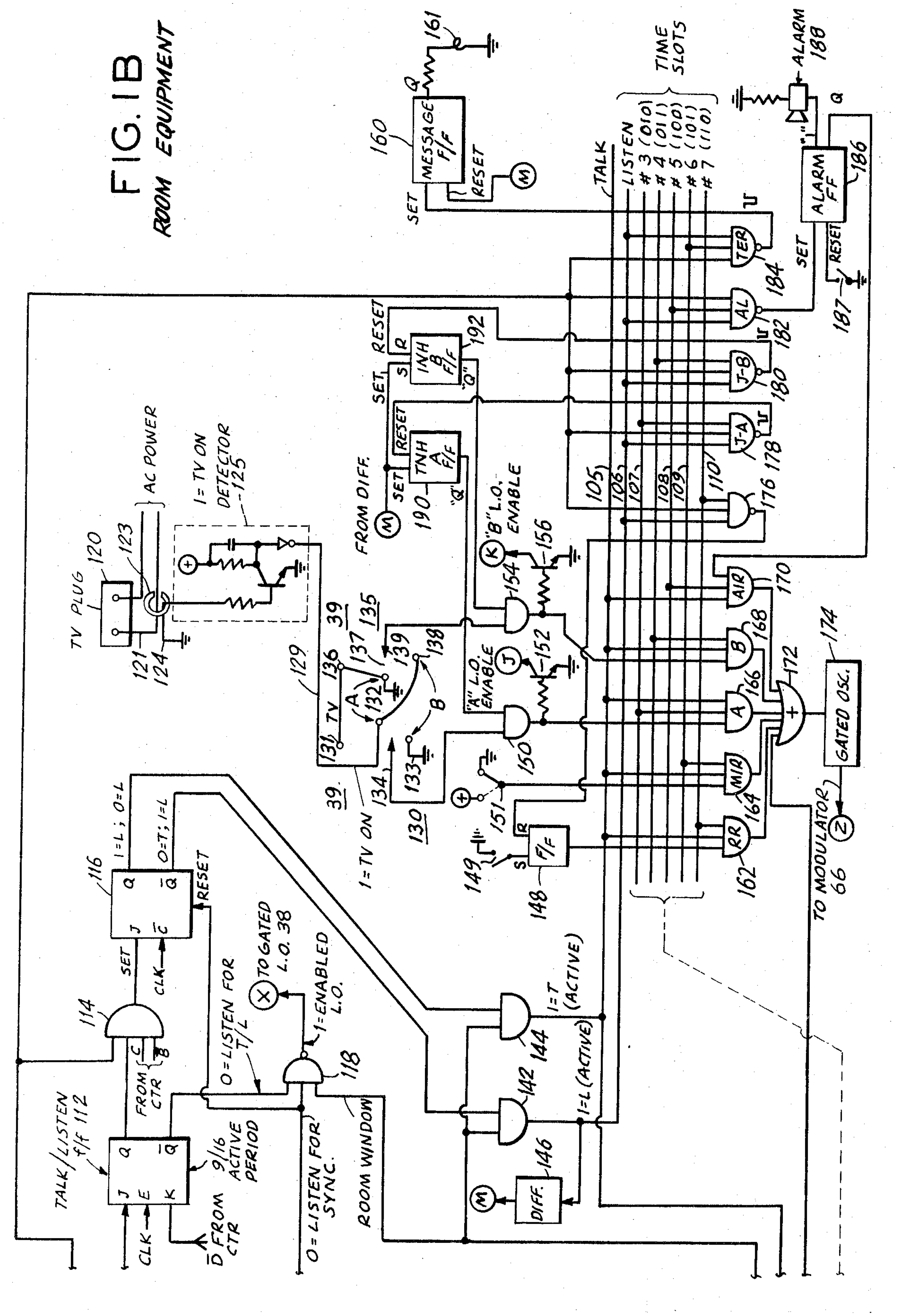
Figure 2:
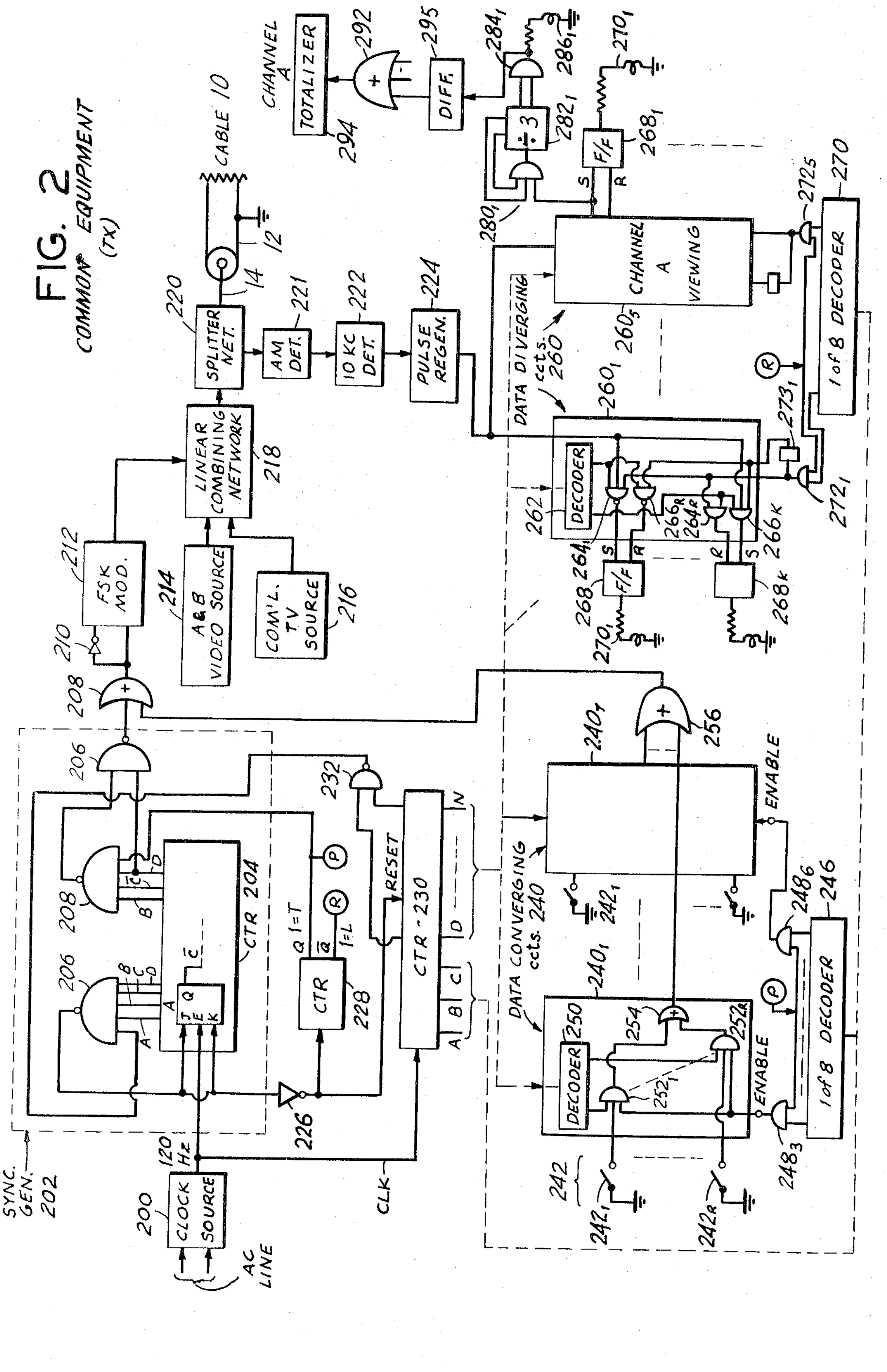
Figure 3:
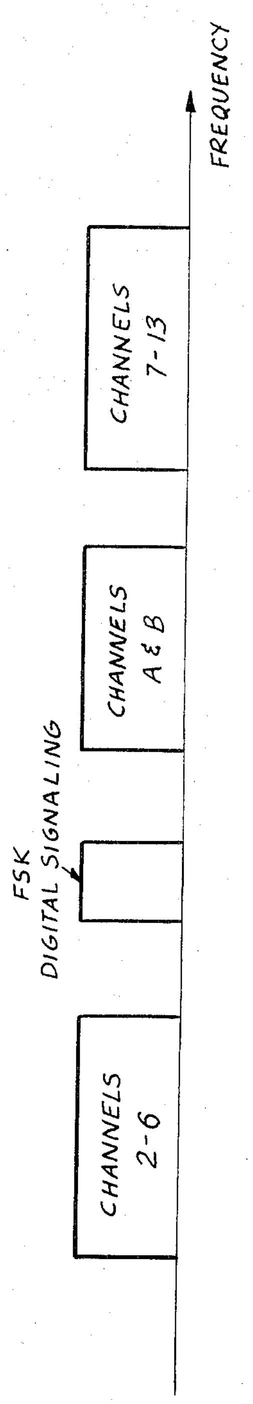
Figure 4:
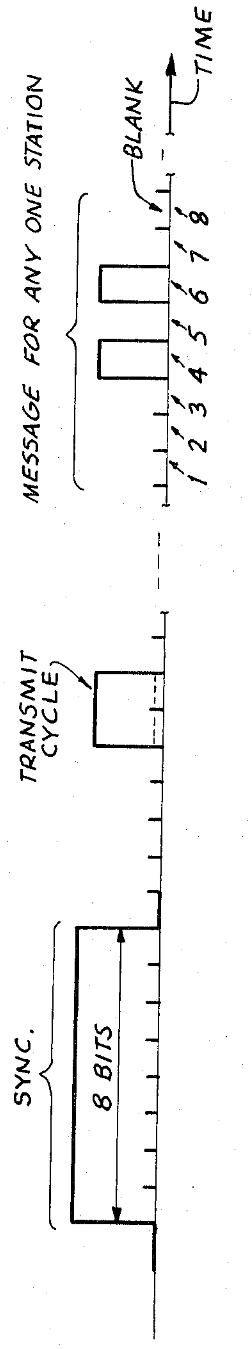

The above and other features and advantages of the present invention will become more clear from the following detailed description of a specific embodiment thereof, presented hereinbelow in conjunction with the accompanying drawing, in which:

FIGS. 1A and 1B comprise the left and right portions of illustrative subscriber station equipment in accordance with the present invention;

FIG. 2 schematically depicts common equipment in accordance with the present invention;

FIG. 3 illustrates the frequency spectrum of signals generated by the common equipment of FIG. 2; and FIG. 4 depicts the nature of the digital wave generated by the common station equipment of FIG. 2.

By way of general overview, the apparatus in accordance with the present invention comprises a bilateral communications system employing, for example, a two wire cable distribution network to which are connected an array of subscriber stations and common equipment. As a specific, illustrative system context, the communications system may be employed in a lodging facility such as a hotel or motel to provide electronic communications between one or more central locations (e.g., the front desk, a telephone operator location, a housekeeper control location, and the like), and the various hotel-motel rooms. The common equipment supplies to the cable locally received commercial television programing; one or more special, supplementary video programs for viewing on the conventional television receiver located in each room; and digital signals for effecting various functions within the room as more fully described hereinbelow.

The frequency distribution of the signals impressed on the cable by the common equipment is shown in FIG. 3 and comprises upper and lower bands for commercial channels 2–6 and 7–13 (of course, not all channels will be occupied in any geographical location), two private video programs denoted A and B herein, and a digital signaling band. The digital signaling band and the private channels A and B may be physically transmitted in any unoccupied part of the local spectrum (as in unoccupied standard television channels, or in the midband gap between the contiguous bounds of channels 6 and 7 as shown in the drawing). For concreteness, two channels A and B are being assumed, although any number may in fact be employed. Also, the digital transmission from the common equipment to the subscriber stations is assumed herein as of frequency shift keyed (FSK) form, wherein one of two frequencies is impressed on the cable depending upon the value of the digital intelligence.

The nature of the assumed digital wave transmitted by the common equipment (i.e., the relatively narrow FSK band shown in FIG. 3) is shown in the time domain in FIG. 4 and comprises a unique preselected clock synchronizing pulse pattern, e.g., comprising nine bits formed of eight digital 1's followed by a digital 0. Further, during alternate transmission cycles, a digital 1 is present or omitted as in the 14th and 15th time slots, the presence of a 1 indicating a transmission cycle (digital signaling from the common equipment to the subscriber stations), and a 0 signaling a receive mode cycle (digital signal communications from the subscriber stations (each in turn) to the common equipment).

Digital signaling between the common equipment and the subscriber stations (and in the reverse direction as well) is effected on a time division basis, wherein eight digit messages are sequentially destined for the array of subscriber stations ad seriatim. Correspondingly, for a receive mode, the systems subscriber stations serially transmit eight digit messages to the common equipment.

The subscriber station destination for any message (transmission mode) or the originator of any message (reception mode) is determined by the state of synchronized subscriber station identifying counters maintained at both the common and remote stations. Eight digit messages formed of seven functionally dedicated bits and an eighth, always 0, guard band bit are assumed herein, although any message length or encoding may be employed (it being most convenient to employ messages of $2^n$ digits). It is again observed that the signaling format set forth above is presented merely for concreteness — any other format, signal encoding or functional cycle variation sequence may be employed.

With the above general precepts in mind, a specific discussion of the system equipment will now be considered. Referring now to FIGS. 1A and 1B, hereinafter referred to as composite FIG. 1, there is shown subscriber station set apparatus located in each of the room locations. The signals described above and shown in FIGS. 3 and 4 are supplied to the room via the system cable 10, which is shown as comprising a coaxial cable formed of a center conductor 14 and a grounded outer sheath 12. The signal first passes to a filter 16 which supplies to an output port 17 only the digital FSK signaling band shown in FIG. 3 (e.g., employing band-pass filter structure). The remaining video information, i.e., commercial channels 2–6 and 7–13, and the private programs A and B are supplied to a filter 16 output port.

Examining first the path associated with the video signals at filter port 18, the FIG. 1 station set includes a master three position selector switch 39 with plural ganged decks 40 and 48, and also 130 and 135 considered below. When conventional television viewing is desired, the switch 39 is placed in its upper, "standard television band" position. For this switch 39 position, the incoming video signals pass to a standard television receiver (not shown) via switch 39 members 44, 41, 49 and 52. Thus, a viewer at the station of FIG. 1 can select any available commercial program on channels 2–6 and 7–13 by the normal selection-tuning process at the receiver. Neither midband channel A nor B may be received since television receivers are typically of discrete tuning form, and cannot receive (select) any midband signals.

To view the channel A or B programs, lodging guests at the subscriber station of FIG. 1 turn the selector switch 39 to the middle or lower switch position, respectively. In either position the video bands of FIG. 3 (possibly less the digital FSK spectrum) are supplied to a mixer 59. Depending upon whether the A or B channel is selected, an appropriate one of the A channel or B channel selecting local oscillators 62 or 64 is activated by a switched ground impressed on an oscillator enabling control port. The local oscillator and mixer 62 or 64 and 59 reduce the selected A or B video program to the intermediate frequency range of a filter-amplifier 60, this range being that, for example, of locally unused channel 3 or 4. The selected private video program A or B then passes via switch members 50 or 51, and 52 to the television receiver where it may be viewed by simply turning the receiver to channel 3 or 4 as appropriate.

The structure of FIG. 1 for processing the digital signals communicated between the subscriber station and the common equipment will now be considered. Treating first digital signals arriving at the FIG. 1 station set, the FSK encoded digital pattern at output port 17 of the filter 16 passes through a linear hybrid network 20 to an FSK detector 26, the network 20 being of any conventional type for passing incoming signals from the cable to the detector 26, while supplying outgoing signals from a modulator and amplifier 66 and 68 to the cable 10. The incoming FSK encoded information passes through a radio frequency amplifier 28 and is shifted to an IF frequency by a mixer 30 and a gated local oscillator 38. The oscillator 38 is enabled (a digital 1 at an oscillator control port supplied by a gate 118) at all times when incoming signals destined for the particular station of FIG. 1 may be present on the cable, i.e., when a sync and talk/listen signal may be produced (the first 16 bits of FIG. 4), and during the particular eight digit time slot associated with the station. The local oscillator 38 is also enabled during the eight bit message window when the particular station of FIG. 1 is transmitting to the common equipment, at which time the oscillator serves as a carrier source.

The FSK digital information at the output of intermediate frequency amplifier 32 is detected by a frequency detector 34, e.g., a discriminator, and passes to a pulse regenerator 36 for squaring. The received digital information is then clocked into a data preserving flip-flop 88.

Synchronized timing must be maintained between each of the remote stations and the common equipment. Thus, for example, digital counters in both the common equipment and subscriber stations must be advanced at a like rate, and be maintained in phase (count state). The timing rate is maintained by using the alternating current 60 Hz line as the rate source, the entire lodging facility typically operating from the same AC buss. To prevent plug polarity ambiguity, system timing is maintained at 120 Hz by full wave line voltage rectification. Thus a clock source 70 in each station includes any apparatus well known to those skilled in the art for full wave rectifying the AC line potential, and for providing a digital output in accordance with the rectified signal. Such structure may comprise, for example, an overdriven amplifier; zero crossing detectors; or the like. Where three phase power systems are employed, the clock source 70 may additionally comprise structure for shifting the AC line timing to a common time base.

The output of clock source 70 is employed to cycle a composite counter 82, e.g., formed of plural cascaded binary counter stages in a ripple configuration. Counter 82 is shown as comprising two counter subsections 84 and 86 each of which has a common (but mutually distinct) reset line. The counter 84 provides output Boolean variables A and A', . . . ,C and C' (A being assumed least significant). Similarly, the counter 86 provides variables D and D', . . . ,N and N'. The counter 86 includes sufficient stages such that $2^{N-D}$ is at least as great as the number of rooms.

In its basic fundamental aspects, the counter section 84 produces three output variables A–C which, when decoded, identify each particular time slot for the eight digits of an incoming message for the station of FIG. 1, or for an outgoing message generated by the station in FIG. 1. Correspondingly, the more significant digits of the counter 82 developed in the counter subportion 86 provide information which identifies when that particular station is to receive a message on the system cable 10, or is to supply a message to the common equipment via the cable. To this end, each of the counter 86 output variables D, D' . . .N, N' are brought out to a switch array 87 which includes N-D transfer switches each of which is connected to a variable or its negation. The particular setting of the array of switch 87 establishes the system identification of a station, determining its active message time for talking or listening to the common equipment.

Thus, for example, the first room might have the switch 87 connected to the counter variables N', . . . , F', E', D (a digital identification 0 . . . 01 = decimal 1) while the last station if full system capacity were used would be connected to the counter variables N, . . . , E, D (digital number 1 . . . 11 = decimal $2^{N-D}$). The unit shown in the drawing is intermediate in designation, having the switches 87 connected to the variables N, . . . , D' thus having a digital value 1 . . . 0. The switch array 87 for the station set in each room is set to a different and unique pattern such that each unit is rendered operable at a different time. This may be done most simply, perhaps, by making the unit number the same as the room number. The switches 87 may, of course, be replaced by hard wire selector jumpers.

It is thus observed that when the counter 86 exhibits the output pattern corresponding to the positions prescribed by the switch array 87 (a binary 1 present at the transfer member of each switch), an AND gate 89 is fully enabled for the full eight counts of the counter 84 until the counter 84 overflows, advancing the counter portion 86 to the next equipment selection number. Thus, the output of the AND gate 89 is a positive going pulse (deemed a room window output pulse) which signals when the particular terminal shown in FIG. 1 is to communicate with the common equipment. Since the 60 cycle AC line is the same or made the same for all subscriber stations and for the common station, the counter 82 for all subscriber stations (and the counter 230 at the common equipment shown in FIG. 2 and discussed below) are advanced at the same rate. Further each subscriber station includes a sync pattern recognition circuit 72 for assuring that the counter 82 at the subscriber stations are in phase, i.e., exhibit a like output digital state.

It is observed at this point that all logic gates treated herein may be embodied by any logic form — e.g., all gates may be formed by suitably connected NAND gates. Also, by way of alternative station set identification apparatus, the switches 87 may be employed to uniquely present the counter 86 responses to the sync signal — all station sets then responding to a like counter state. The sync circuit 72 in each station set examines the FSK encoded data transmitted by the common equipment, present at the output of the flip-flop 88 as above discussed, for the requisite sync pattern of eight digital 1's followed by digital 0 and, in response thereto, performs its initializing function. By way of initial conditions, at the end of the previous operative cycle and before a sync code burst is encountered, a run/stop flip-flop 80 is reset such that the high Q' output thereof partially enables a NAND gate 74. The gate 74 is further partially enabled by the output of a NAND gate 76 which has at least one input thereof low (i.e., at digital 0). By way of further circuit action at this time, the reset lines of the counters 84 and 86 are both low, counting thereby being inhibited and each counter exhibiting an all 0 output state.

When a proper synchronizing code pattern is received, the seven leading digital 1's thereof (and each of them) switch the gate 74 (the output thereof going low) which drives the output of a NAND gate 78 high enabling counting in the counter stages 84. The final 1 digit of the eight bit leading portion of the sync pattern maintains this posture as the counter 84 recycles towards its 000 output state (digital 1's at the A', B' and C' terminals). Thus, assuming the proper eight consecutive digital 1's are received, the lower three input signals to the NAND gate 76 are high, as is the second topmost input supplied by the Q' output of the run/stop flip-flop 80. If the ninth transmitted digit of the sync pattern is the requisite digital 0, the output of the NAND gate 74 goes high and the NAND gate 76 is fully enabled. Gate 76 thereby maintains the counter 84 in a counting mode via the gate 78 which supplies a high potential at the counter reset terminal.

Further, the positive going output of an inverter 79 connected to the gate 76 acts in conjunction with the clock signal for setting the run/stop flip-flop 80 (run state) and also sets a talk/listen flip-flop 112 for the transmission mode-reception mode decision interval (including the 13th and 14th cycle time slots). The resulting low going potential at the Q' output of flip-flop 80 holds the counter 84 in a counting mode for the remainder of the operative cycle, through the gate 78. Further, the high potential at the Q output of the set flip-flop 80 enables counting in the counter portion 86 such that the counter 82 is now fully enabled and begins a full $2^N$ state counting cycle at the 120 Hz rate. Moreover, since all subscriber station equipment responds to the same sync pattern, the counter 82 at each station will be in phase, i.e., exhibit a like output digital pattern. The initially low Q' output of the talk/listen flip-flop 112 acts through the NAND gate 118 to enable the gated local oscillator 38 while the circuit 82 is examining incoming data for sync, such that digital information on the cable 14 is continuously received by the station set during such period.

It is observed that any binary sequence other than the proper sync pattern will not be recognized and responded to by the circuitry 72. That is, some condition of a nonsync incoming pattern will cause the counter 84 to be reset to its all 0 state to again begin examining the incoming data for a sync pattern, such that the run flip-flop 80 will not be set.

By way of final cycle initialization for the station set apparatus, it must be determined whether the instant digital operative cycle is a transmission mode or a signal receiving mode — signaled by the presence or absence of a transmitted digital 1 during the 13th and 14th cycle time slots. To this end, an AND gate 114 is partially enabled during these time slots (signalled by a 1 at the Q output terminal of flip-flop 112 and binary 1's at the B′ and C outputs of counter 84). If a digital 1 is received during this time (transmission cycle), the Q output of the data storing flip-flop 88 is high fully switching the AND gate 114 and setting a talk/listen latch flip-flop 116 for the duration of the operative cycle, giving rise to a relatively high and relatively low output potential at the flip-flop Q and Q′ output terminals, respectively. Correspondingly, for a receive mode cycle, a digital 0 is present at the output of data flip-flop 88 during the critical time slots, thus not switching the gate 14 and leaving the flip-flop 116 in its reset condition. For this condition Q′ of flip-flop 116 will be high and Q will be low.

The talk/listen outputs of the flip-flop 116 pass through coincidence (AND) gates 142 and 144 along with the room window output from the gate 89. The outputs of the gates 142 and 144 (only one of which can be high at any one time) and the talk/listen buss lines 105 and 106 connected to these gates, are thus enabled only during the room window period when the room equipment of FIG. 1 is operatively connected to the system common equipment.

Circuit functioning when a subscriber at the FIG. 1 equipment selects a particular viewing mode will now be considered. Examining the decks 130 and 135 of the switch 39, when the switch is in the upper position to select commercial television for viewing, a ground signal is applied to AND gates 150 and 154 which thus exhibit relatively low output potentials. Transistors 152 and 156 having their base-emitter junctions respectively connected to the outputs of the gates 150 and 154 and thus not energized, and the collectors of the transistors 152 and 156 present a very high impedance to ground. Accordingly, the A and B channel local oscillators 62 and 64 are inert at such times.

When the private service channel A is selected for viewing by the selector switch transfer members 134 and 139 respectively engaging the middle switch contacts 132 and 137, the gate 154 remains disabled (a grounded input), and the B channel local oscillator 64 is off. However, assuming that the subscribers television receiver is on (a high signal output of a "television on" detector 125 impressed on a line 129 as below discussed), a high voltage is connected to the left input of the gate 150. Assuming that an inhibit A channel flip-flop 190 is set (giving the subscriber access to the A channel or, inversely stated, not locking out the A program at the FIG. 1 station), the gate 150 is fully enabled and its output is high thus turning on (and saturating) the transistor 152, thereby activating the A channel local oscillator 62. In the manner above discussed, with the switch 39 in its intermediate position, private supplementary channel A is shifted in frequency to the empty channel 3 or channel 4 band by the local oscillator, mixer and filteramp 62, 59 and 60 where it may be viewed by simply tuning the television receiver to channel 3 or 4 as appropriate.

Similarly, with the switch 39 in its bottom position, the gate 150 is disabled, while the B channel gate 154 renders the transistor 156 conductive, thereby impressing the B channel local oscillator 64 into service. Accordingly, the converter 55 shifts the B supplementary channel into the channel 3 or channel 4 frequency band for viewing.

As anticipated above, there must, of course, be no customer billing when the FIG. 1 subscriber station equipment switch 39 is set to one of the A or B positions, but when the television set in the room is off. To this end, the television is plugged into a receptacle 120 in the station set, and a ferromagnetic core 123 (linear or square hysteresis loop) inductively coupled to one of the power leads carrying AC current to the television receiver. Accordingly, a secondary winding 124 coupled to the core has an AC potential induced therein when the television receiver is on, and not otherwise. The incidence of this induced AC potential gives rise to a binary 1 (high potential) output on the conductor 129 from the "television on" detector 125 when the receiver is on, the conductor 129 exhibiting a low potential when the receiver is off. Specific embodiments for the conductor 125 will be readily apparent to one skilled in the art, e.g., a saturated integrated amplifier, zero crossing detector, amplitude comparator, or the like.

With the above system functioning in mind, the various operations implemented responsive to digital messages from the common equipment to the station of FIG. 1 (i.e., transmission (subscriber station listen) mode operation wherein the talk/listen latch flip-flop 116 is reset-Q′ high, Q low) will first be considered.

It will be recalled that the communication from the common equipment to the spaced station sets comprises eight operative time slots. The significance of the seven active bit locations (time slots) in a transmitted message are as follows:

| Bit No. | Transmission Mode Significance |
|---|---|
| 1 & 2 | Reserved for particular user requirements. |
| 3 | Inhibit reception of Channel A. |
| 4 | Inhibit receiption of Channel B. |
| 5 | Sound wake up alarm. |
| 6 | Illuminate "telephone or other message at desk" light. |
| 7 | Reset "room ready and available" flip-flop. |

The reserved (and/or additional) bits may be used for additional or other lodging service functions as desired. Also, encoded messages rather than dedicated digits may be employed to increase the transmitted digited intelligence from $n$ nits to $2^n$ nits.

Similarly the significance of the digital locations of messages transmitted by the subscriber stations to the common equipment is assumed to be as follows:

| Bit No. | Reception Mode Significance |
|---|---|
| 1 & 2 | Security reporting on television set status. |
| 3 | Channel A being viewed. |
| 4 | Channel B being viewed. |
| 5 | Acknowledge wake up alarm. |
| 6 | Maid in room. |
| 7 | Room ready for occupancy (maid finished). |

Circuit functioning associated during the active transmission intervals 3–7 will now be treated. During the third time slot (digital code 010 since the first time slot occurs at 000), the station set counter portion 84 exhibits an output pattern 010 where A′, B and C′ are high, thereby supplying a high potential at the output of a time slot decoding gate 94 for one clock pulse (1/120 sec. = 8.33 msec.). Thus, during this period, a time interval number 3 output buss 107 and the listen buss 106 (and only these leads of the array 105–110) are energized (high potential). These two signals partially enable a NAND gate 178 (NAND gates are disclosed herein as driving most flip-flops with ground going output signals as used, for example, to excite an input of a cross coupled NAND gate flip-flop).

If the data transmitted by the common equipment during this third time slot is a 1 (indicating that the picture on the A channel is intended for a restricted audience, and is not to be obtainable at the station set of FIG. 1), the data storage flip-flop 88 in set (high Q output). The flip-flop 8 thus supplies the final regius enabling input to the gate 178 which resets the inhibit A flip-flop 190. The resulting low output at the Q flip-flop 190 output terminal disables gate 150, thereby preventing the local oscillator 62 required for A channel viewing from turning on, even though the selector switch 39 may be set to the middle, or A channel position. Thus, channel A cannot be received at the station.

It is observed that the A channel inhibit flip-flop 190, and other station set flip-flop including the unit 192 associated with B channel viewing, are set (cleared) at the beginning of the room window interval during a transmission mode cycle of a differentiator 146 which responds to the positive going room window — listen mode output of gate 142. Thus, if an 0 rather than a 1 is transmitted to the FIG. 1 station set during the third time slot (the general case), channel A may be received by the FIG. 1 station.

Similar functioning occurs during the fourth time slot wherein the B channel movie or program may be selectively blocked at the station of FIG. 1 responsive to a transmitted 1 (elements 96, 180 and 192 operating in a manner analogous to elements 94,178 and 190 above discussed).

A 1 transmitted during the fifth time slot of the message for the FIG. 1 station signals that a wake up alarm is to be sounded. To this end, incidence of the fifth time slot is decoded by an AND gate 98, making the lines 106 and 108 of the array 105–110 high. A NAND gate 182 switches if the incoming data is a 1, setting an alarm flip-flop 186 which turns on an alarm 188 by impressing a high voltage at the flip-flop 186 Q output terminal. The alarm may be any voltage actuated audible source well known to those skilled in the art, or a relay having contacts which operate an audible element. Similarly, if a zero is present in the fifth time slot of the message, the 0 on the data line blocks the gate 182 and the flip-flop 188 remains in its initial reset condition, thus not sounding an alarm.

Similarly a gate 100 activates a buss 109 during the sixth time slot which, together with the enabled listen buss 106 partially enable a NAND gate 184. If the then occurring incoming data message bit is a 1, a "message waiting" flip-flop 160 is set energizing a lamp 161 in the room. Someone entering the room and seeing the illuminated element 161 is thus advised to check with the desk for a message.

The flip-flop 160 is reset at the beginning of every listen cycle room window, and is thus off for the six clock pulses (less than 100 msec) between the leading edge of the listen cycle room window, and the sixth slot when it is again turned on if an existing message remained outstanding. This flicker will typically not be noticed, and in any event is of no purport. The lamp 161 is finally reset by transmitting a zero.

As a final receive mode function, a gate 102 detects the seventh time slot of a message interval, and a NAND gate 176 is, or is not, switched depending upon whether the incoming data is a 1 or a 0, respectively. The output of the gate 176 resets a room availability flip-flop 148 which is set by a chambermaid after the room has been made up—as when a room is let. The state of the ensemble of flip-flops 148 in the several station sets is thus a measure of room availability.

Turning to reception mode operation of the FIG. 1 station, the status of various parameters associated (talk/listen latch flip-flop 116 set, Q=1, Q′=0), when the room is communicated to the common equipment during the proper room window interval. As a first communication function during the receive mode (station talking), room window interval, an AND gate 92 decodes and responds to the first and second message period time slots. Two time slots are employed in the beginning of the room window period to overcome transients at the beginning of the room window interval.

The output pulse of gate 92 during the first and second time slots passes through an OR gate 172 and turns on a gated oscillator 174. The output of oscillator 174 is supplied to an amplitude modulator 66 which modulates a carrier wave comprising the output of the gated local oscillator 38. It is observed that the local oscillator 38 is on during the entire room window period, both talk and listen modes, since the gate 118 is fully enabled at such times. The sinusoidal carrier of local oscillator 38, selectively modulated by the oscillator 174 frequency (binary 1 transmission) is filtered and amplified by element 68 and passes via elements 20 and 16 to the cable 10 for propagation to the common equipment. It is observed that digital 1's and 0's communicated from station to common equipment are respectively manifested by amplitude modulation at the oscillator 174 frequency, or the absence of modulation, on the oscillator 38 carrier. FSK is not employed for transmission in the direction toward the common equipment to obviate the necessity for aligning the requisite two differing frequency oscillators in each subscriber station.

The function effected by the security gate 82 during the first and second time slots is to assure that the equipment is working, and that the converter and television have not been removed from the room, television thefts being an all too common occurrence experienced by lodging proprietors. Thus, when no signal is received at the common equipment during the beginning of any message, the situation is immediately investigated.

During the third time slot of the message transmitted by the FIG. 1 equipment, the activated time decoding gate 94 energizes the lead 107 which, together with the talk buss 105, are active (high potential) of the buss array 105–110. These lines partially enable an AND gate 166. If the station of FIG. 1 is tuned to channel A, the resulting high output of the AND gate 150 switches the gate 166 which acts through the OR gate 172 to turn on the oscillator 174. Thus, a binary 1 is communicated to the common equipment at time slot three so that the subscriber may be billed for viewing the special program on channel A when appropriate, as more fully discussed below. If a subscriber is not switching channel A (i.e., if the switch 39 is in a position different from channel A; if the television is off; or if the inhibit A flip-flop 190 prescribes channel A reception) the output of the gate 150 is low and the oscillator 74 is off. Thus, a digital 0 (unmodulated local oscillator 38 carrier) is communicated to the common equipment.

Similar operation obtains during the fourth time period when a report is made with respect to channel B viewing.

In time slot five, an enabled AND gate 98 energizes buss 108 which, together with active talk buss 105, partially enables AND gate 170. If the occupant of the room has responded to a wake up alarm by actuating an alarm flip-flop 186 resetting switch 187, the resulting high output at the Q′ flip-flop output fully switches the AND gate 170 which turns on the oscillator 174 (digital 1 communicated). If the alarm flip-flop 186 is still set, a 0 is communicated.

When a chambermaid is in the room, she operates (ungrounds) a switch 151, thereby supplying a final requisite high (digital 1) input to an AND gate 164. Accordingly, the gate 164 becomes fully enabled during the sixth time slot and activates the oscillator 174 such that a digital 1 is communicated. When the chambermaid leaves, she withdraws an actuator key which returns the switch 151 to ground, thereby blocking the AND gate 164 and transmitting a digital 0 during the appropriate sixth time slot of all subsequent receive cycles.

Finally, during the seventh time slot decoded by the AND gate 102, the condition of the room status indicating flip-flop 148 is signalled via an AND gate 162, the OR gate 172 and the selectively gated oscillator 164. The flip-flop 148 is set by the chambermaid when she completes her work by momentarily depressing position button switch 149. The switches 149 and 151 may be formed of a single construction operated by a special key.

The above discussion has been directed to operation of the room station equipment in both the transmit and receive modes. Attention will now be directed to FIG. 2 which depicts the system common equipment which supplies the outgoing sync pattern, transmit/receive mode information, and outgoing digital messages to the system subscriber stations, and which accepts and displays information received from the stations. The common equipment includes a clock source 200 which supplies the 120 Hz clock pulse train in a manner discussed above with respect to the subscriber station clock sources 70. As a first considered common system function, the common equipment includes a sync generator 202 for supplying the sync pattern discussed above, viz., eight digital 1's followed by a digital 0. To this end, a four stage counter 204 (output variables A, A′ . . . ,D,D′) is selectively cycled by the clock 200. In particular, at the beginning of each transmit or receive mode cycle, a NAND gate 232 provides a low output potential (decoded final counter 230 state) which renders the output of a NAND gate 206 high, thereby initiating counting at the four stage cascaded counter chain 204. The counter 204 assumes a 000 state, with the D counter output remaining low for an eight count interval. The low D counter output renders the output of the NAND gate 206 high which, passing through an OR gate 208, supplies a 1 digital signal to an FSK modulator 212. The modulator 212 may comprise any well-known configuration therefore, e.g., two gated oscillators of different frequencies respectively turned on by a 1 at an output of the OR gate 208, or a 1 output of an inverter 210 connected to the gate 208. Thus, the requisite eight digital 1's are generated while the counter 204 D output remains low. Thereafter, i.e., for the second eight counts, the D input to the gate 206 goes high. During the ninth count, a NAND gate 208 is not enabled (B=0). A low output is thus present at the outputs of the gates 206 and 208 thereby giving rise to a digital 0 at the FSK modulator 212, completing the requisite sync pattern. The digital information encoded by the FSK modulator 212 is impressed on the cable 210 by linear combining and hybrid networks 218 and 220 of any known construction.

It is also observed that during the first sixteen clock pulses of each operative cycle, the disabled (high output) AND gate 206 acts through an inverter 226 to hold the counter 230 in a cleared, all 0 reset condition (low counter reset terminal potential). The single pulse generated at the output of the inverter 226 during each cycle also toggles a binary counter 228 to render every other operative cycle a transmission or reception mode cycle.

During the transmit/receive decision interval, the left three inputs of the gate 208 are high. The gate 208 thus switches for a transmission mode cycle (Q of flip-flop 228 = 1), and not otherwise. For such transmit cycles, the output of the gates 206 and 208 is high impressing the requisite binary 1 transmission mode signal on the cable 10 at the proper time.

After one full cycle for the four stage counter 204, the gate 206 inputs are again fully satisfied. The resulting low gate output potential blocks further counting at the counter 204, and also gives rise to a high count enabling reset potential for the counter 230. The counter 230 thus starts counting clock pulses (i.e., line voltage half cycles) at precisely the same time as do the subscriber station sets. The station set counters 82 and the common equipment counter 230 are therefore maintained in synchronization.

The common equipment includes a source 216 of commercial television signals, e.g., any master antenna system, the signals being impressed on the distribution cable. Also supplied to the cable are the A and B programs via a source 214 thereof.

Data transmission mode from the common equipment to the subscriber station will next be considered. In over-all view, the common equipment includes a plurality of data converging circuits 240 each of which, in sequence, supplies an output digit characterizing the state of a switch $242_i$. Eight such digits (including vacant first, second and eighth time slots) make up a message for a subscriber station, the process then repeating for the next station, and so forth. The signals generated by the converging circuits 240 pass through a common OR gate 256 and are supplied via the OR gate 208 to the FSK modulator 212 to be encoded onto the cable 10. Thus, for example, the switch $240_1$ may serve to supply the signals which selectively set the channel A inhibit flip-flops 190 in each of the stations; another converging switch 240 selectively sets the B inhibit flip-flops 192; a further circuit 240 selectively sets the alarm flip-flops 186, and so forth.

Associated with each circuit 240, e.g., the circuit $240_1$ for channel A inhibiting, is an array of switches $242_1 - 242_k$, where the subscripts identify each different station set (room). The switches serve as an input medium to enter transmission mode intelligence in the composite system. If a switch $242_i$ is closed, a digital 0 will be transmitted (channel A reception allowed) in slot 3 of the *i*-th room message, while an open switch will block reception at the receiving station set (the coding may be reversed by using a negation element in the path 256–208–212).

To develop the message for any recipient subscriber station set, identified by the most significant counter 230 digits, the converging circuits 240 are enabled in turn, by a decoder 246 and gating 248, to supply a sequence of digits which comprise the full message for that station.

Various configurations for the data converging circuit 240 are well known by those skilled in the art, and will not be discussed in detail. For example, as shown in the drawing, the circuit 240 (and the others as well) may comprise a decoder 250 which partially enables one of an array of AND gates 252 depending upon the station identified by the counter 230 digits D–N. The selected gate is further partially enabled during the transmit mode cycle (Q of flip-flop 22 and 21 partially enabling a gate 248), and by the time slot (1 of 8) decoded output of the decoder 246. Thus, during time slot number 3 for the first subscriber station, the state of switch $242_1$ is signalled by gates $252_1$ and 254 of data converging circuit $240_1$, the OR gates 256 and 208, and the FSK modulator to the cable 10.

During the next clock interval, the three least significant digits of the counter 230 will advance one count, thereby communicating the state of a switch $242_1$ associated with the channel B flip-flop converging switch. Like functioning continues through the seventh message time slot when the state of the first switch $242_1$ of converging circuit $240_5$ is passed through OR gate 256 to selectively signal a reset for the first station flip-flop 148.

Such operation iteratively recurs as the messages for each of the system subscriber stations are read out in turn.

In the receiving mode, signals communicated by the system subscriber stations pass through network 220 to an amplitude detector 221 which supplies either a DC output potential, or an oscillation at the frequency of the oscillator 174 (0 or 1 information). Information in binary format is recovered by a frequency detector 222 which is regenerated in a pulse regenerator 224. The information from any particular station is then steered by a 1 of 8 decoder 270 to data diverging circuits 260 where the bits transmitted from the *i*-th station respectively illuminate displays $270_i$, e.g., semiconductor light emitting diodes, at the *i*-th position for each data diverging circuit 260. For the data receiving, diverging circuit 260, flip-flops 268 are provided to retain the desired lamp state until the next receive mode cycle.

Circuit operation for signal reception proceeds in a manner inverse to signal transmission, except that a first NAND gate 266 at each lamp position resets the associated lamp latching flip-flop 268 at the beginning of the lamp illuminating time slot (the gate 266 being enabled at the leading edge of the time slot by a differentiator 273). The actual information (lamp on or off) is gated to the set flip-flop input terminal by a NAND gate 264 during the time slot responsive to enabling signals from a station set identity decoder 262, the output of the decoder 270, and the actual data at the output of pulse regenerator 224. Thus, for example considering circuit 260, (T.V. security), the flip-flop 268 is reset — no matter what the actual information content, at the beginning of the first time slot for the message from the first station by the gate $266_1$. Then, assuming the television set for station 1 has not been removed or unplugged, the binary 1 signal present during the time slot will fully enable the AND gate 264 of circuit $260_1$ to set the flip-flop $268_1$ such that the lamp $270_1$ will be illuminated, verifying that the set is still in place. If the light is out, someone will immediately be dispatched to determine the situation. The "off" duration for flip-flop $268_1$ is so short as to be virtually unobservable (this is typically of no moment in any event). Further, depending upon the construction of the flip-flops 268 employed, logic may be employed to operate the gates 264 and 266 on a mutually exclusive basis.

Similarly, the other five incoming digits in the message from the first station will be displayed in the first position $270_1$ of the remaining data diverging circuits 260. System functioning proceeds as above described, inverse whereby the message from each station set selectively illuminates light sources across the ensemble of circuits 260 until all incoming information has been registered.

The functional state of each monitored parameter may then simply be determined by viewing the array of lights 270 associated with that parameter.

In accordance with one aspect of our invention, we have found it desirable to permit a viewer to sample each of the subscription programs A or B for a period of time before any billing commitment is entered. Thus, as one system parameter, a number (e.g., three) of positive supplementary channel (e.g., channel A) viewing returns are required before a lamp $286_i$ is set by an associated flip-flop $284_i$. The lamps $286_i$ are used for subscriber billing purposes. Such action is effected by supplying each affirmative viewing return from the *i*-th room station set to a divide-by-three counter $282_i$ wherein the counter is latched by blocking an associated gate $280_i$ after a three count has been stored within. Thus, when the system reports that channel A (or B) has been viewed three times during a movie (at three spaced receive mode sampling cycles — a minimum of at least several minutes), a further count decoding gate 284 illuminates the light $286_i$ to indicate that this station set is to be billed for the movie or the like.

As a further feature, each time a light 286 is turned on, a differentiator 295 supplies a pulse via an OR gate 292 to a totalizer 294. Since two lights can never go on simultaneously by the nature of time division communications, the totalizer 294 displays the total number of sets viewing any channel. Following the movie, the totalizer and the storage elements 282 may be manually reset.

The above described bilateral communications system has thus been shown to provide video and digital signalling between common equipment and plural station sets in a reliable and improved manner.

The above described invention is merely illustrative of the principles of the present invention. Numerous modifications and adaptations thereof will be readily apparent to those skilled in the art without departing from the spirit and scope of the present invention.

What is claimed is:

1. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means.

2. A combination as in claim 1 wherein said common means further comprises means for generating a predetermined distinctive synchronizing code pattern and for impressing said pattern on said signal propagating means, each of said station means comprising means for recognizing said distinctive synchronizing pattern generated by said common means.

3. A combination as in claim 2 wherein said synchronizing code pattern generating means in said common means comprise counter means, and additional logic means connected to the outputs of said counter means for providing output signals for particular states of said counter means.

4. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means, wherein said common means further includes distinctive synchronizing pattern generating means including counter means, and additional logic means for enabling said counter means for a predetermined number of consecutive count intervals.

5. A combination as in claim 4 wherein each of said plural station means includes a counter which is subdivided into plural stage groups each having a common reset port, and wherein said distinctive synchronizing code pattern recognizing means in said station means includes logic means having inputs connected to one group of said counter stages, and an output connected to one of said counter group reset ports.

6. A combination as in claim 5 further comprises flip-flop means selectively enabled by said synchronizing pattern recognition logic means, said flip-flop output selectively signaling the reset port of the other counter stage group.

7. A combination as in claim 2, wherein said common and station timing means each comprise a binary counter connected to the respective clock means, and wherein said station means includes means responsive to the reception of said distinct synchronizing pattern communicated via said signal propagating means for resetting said counter included at said station means.

8. A combination as in claim 1 wherein said video signal supplying means included in said common means comprises means for supplying commercial video programs, and supplementary programs exhibiting a frequency spectrum not otherwise occupied by said commercial programming.

9. A combination as in claim 1 wherein said common means further comprises frequency shift keyed modulator means for modulating said digital wave train supplied by said time division multiplexing means and wherein each of said plural station means includes frequency shift keyed detector means.

10. A combination as in claim 1 wherein said message impressing means of said station means includes reporting means for signaling that said station means is selecting said at least one video signal for viewing.

11. A combination as in claim 1 wherein said message responsive means in said station means is responsive to a predetermined code pattern of said message from said common means.

12. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means, wherein said digital wave train supplying means in said common means comprises plural time division multiplexing circuits sequentially enabled by said common timing means, plural digital input signal means each for a different one of said station means connected to each of said time division multiplexing circuits, and disjunctive logic means connecting the output of said time division multiplexing circuits to said signal propagating means.

13. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means, wherein said digital wave train receiving means included in said common means comprises plural time division multiplexing circuits sequentially enabled by said common timing means, plural indicating means each associated with a different one of said station means connected to plural outputs of each of said time division multiplexing circuits, and means connecting said common signal propagating means with a signal input in each of said time division multiplexing circuit means.

14. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means, wherein said digital message impressing means included in each of said station means comprises a first oscillation source, and means for selectively amplitude modulating the oscillation produced by the said first source thereof in accordance with said digital message, and wherein said message receiving means in said common means includes amplitude modulation detector means.

15. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means, further comprising a gated oscillation source, means for gating said oscillation source in accordance with said digital message, wherein said amplitude modulating means selectively modulates a carrier with the output of said gated oscillation source.

16. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means, wherein said station means includes video signal inhibiting means, means for enabling said signal inhibiting means in accordance with the information content of the message received by said station means from said common means, and means responsive to said inhibiting means for disabling said converter means.

17. A combination as in claim 16 wherein said station means converter means comprises heterodyne means including a local oscillator associated with said at least one video signal, and wherein said inhibiting means comprises bistable means for selectively disabling said local oscillator.

18. In combination in a bilateral communication system for distributing video information to standard television receivers, signal propagating means; plural station means and common means connected to said signal propagating means; said common means including means for supplying at least one video signal to said signal propagating means in a form unreceivable by a standard television receiver, time division multiplexing means for supplying to said signal propagating means during transmission mode intervals a digital wave train comprising serial binary messages each destined for a different one of said station means, additional time division multiplexing means for selectively receiving from said signal propagating means during receive mode intervals a digital wave train comprising serial binary messages each originating at a different one of said station means, bit timing supply means, and common timing means coupled to said bit timing supply means connected to said time division multiplexing means and said additional time division multiplexing means for providing signals identifying the time periods during said transmission mode and receive mode intervals when a particular one of said plural station means is then operatively connected to said common means via said signal propagating means; each of said plural station means including converter means for converting a video signal to a form which can be displayed by a television receiver, station timing means responsive to the output of said bit timing supply means for synchronizing said station means with said common timing means, decoder means connected to said station timing means to provide a signal to indicate the interval during said transmission and receive mode intervals when said station means is connected to said common means via said signal propagating means, means enabled by said decoder means for receiving a message for said station means from said common means, and means enabled by said decoder means for impressing a digital message for said common means on said common signal propagating means, wherein said station timing means includes coincidence logic means including plural switch means for imparting a unique identification to said station means.

* * * * *